United States Patent [19]

Feigenbaum

[11] Patent Number: 4,467,019
[45] Date of Patent: Aug. 21, 1984

[54] FUEL CELL WITH ELECTROLYTE FEED SYSTEM

[75] Inventor: Haim Feigenbaum, Highland Park, N.J.

[73] Assignee: Engelhard Corporation, Iselin, N.J.

[21] Appl. No.: 430,156

[22] Filed: Sep. 30, 1982

[51] Int. Cl.³ ............................................ H01M 8/04
[52] U.S. Cl. ...................................... 429/34; 429/38; 429/72
[58] Field of Search ....................... 429/34, 38, 39, 41, 429/13, 51, 80, 72, 44

[56] References Cited

U.S. PATENT DOCUMENTS

| | | | |
|---|---|---|---|
| Re. 25,913 | 11/1965 | Solomon et al. | 429/116 |
| 2,969,315 | 1/1961 | Bacon | 204/284 |
| 3,160,527 | 12/1964 | Hess | 429/41 |
| 3,223,556 | 12/1965 | Cohn et al. | 429/34 |
| 3,251,718 | 5/1966 | Hilton | 429/41 |
| 3,300,343 | 1/1967 | Huber et al. | 429/34 |
| 3,441,442 | 4/1969 | Bushnell et al. | 429/34 |
| 3,467,552 | 9/1969 | Giner | 429/41 |
| 3,479,225 | 11/1969 | Chodosh et al. | 429/28 |
| 3,481,737 | 12/1969 | Siebenberg et al. | 429/41 |
| 3,554,809 | 1/1971 | Craft | 429/13 |
| 3,634,139 | 1/1972 | Reiser | 429/34 X |
| 3,779,811 | 12/1973 | Bushnell et al. | 429/26 |
| 3,867,206 | 2/1975 | Trocciaola et al. | 429/35 |
| 3,905,832 | 9/1975 | Trocciaola | 429/39 |
| 3,954,502 | 5/1976 | Symons et al. | 429/39 |
| 3,981,749 | 9/1976 | Fukuda et al. | 429/41 |
| 4,035,551 | 7/1977 | Grevstad | 429/44 |
| 4,038,463 | 7/1977 | Lamarine et al. | 429/44 |
| 4,064,322 | 12/1977 | Bushnell et al. | 429/41 |
| 4,115,627 | 9/1978 | Christner et al. | 429/44 |
| 4,185,145 | 1/1980 | Breault | 429/34 |
| 4,219,611 | 8/1980 | Breault | 429/13 |
| 4,311,771 | 1/1982 | Walther | 429/51 |
| 4,366,211 | 12/1982 | Pollack | 429/38 |

Primary Examiner—Anthony Skapars

[57] ABSTRACT

A fuel cell having a pair of electrodes at the sites of electrochemical reactions of hydrogen and oxygen and a phosphoric acid electrolyte provided with an electrolyte supporting structure in the form of a laminated matrix assembly disposed between the electrodes. The matrix assembly is formed of a central layer disposed between two outer layers, each being permeable to the flow of the electrolyte. The central layer is provided with relatively large pores while the outer layers are provided with relatively small pores. An external reservoir supplies electrolyte via a feed means to the central layer to compensate for changes in electrolyte volume in the matrix assembly during the operation of fuel cell.

5 Claims, 1 Drawing Figure

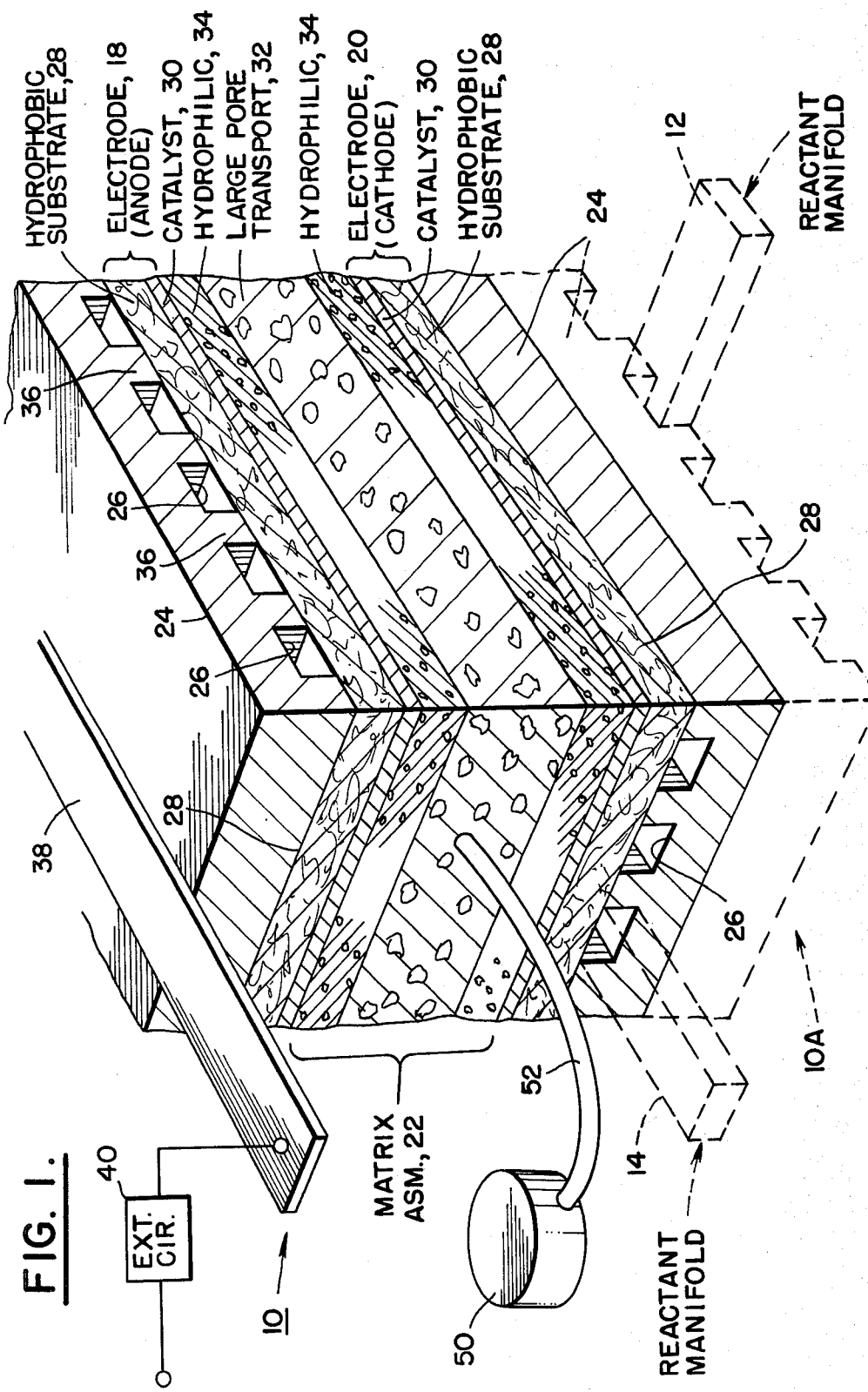

FUEL CELL WITH ELECTROLYTE FEED SYSTEM

The Government has rights in this invention pursuant to Contract No. DE-AC01-78ET15366 awarded by the U.S. Department of Energy.

BACKGROUND OF THE INVENTION

Reference is hereby made to other related patent applications which are assigned to the same assignee as the present application; Application of O. Adlhart entitled "Fuel Cell With Multiple Porosity Electrolyte Matrix Assembly", Ser. No. 430,143, Filed on Sept. 30, 1982,; Application of O. Adlhart and H. Feigenbaum entitled "Fuel Cell And System For Supplying Electrolyte Thereto", Ser. No. 430,144, Filed On Sept. 30, 1982,; Application of J. Cohn, H. Feigenbaum and A. Kaufman entitled "Fuel Cell And System For Supplying Electrolyte Thereto With Wick Feed", Ser. No. 430,155, Filed On Sept. 30, 1982; and Application of H. Feingenbaum entitled "Fuel Cell And System For Supplying Electrolyte Thereto Utilizing Cascade Feed", Ser. No. 430,145, filed on Sept. 30, 1982.

This invention relates to fuel cells and, more particularly, to a fuel cell having a laminated porous matrix assembly disposed between the electrodes of the cell, the individual lamina having differing porosities for distributing electrolyte into the region between the electrodes as such electrolyte is needed during the generation of electricity.

Much research is being done in the area of fuel cell technology in order to provide ever increasing amounts of electric power and for operating such cells over longer periods of time without any need for shutdown to accomplish maintenance. As compared to other methods of generation of electric power from combustible fuels, a fuel cell has higher efficiency and is also characterized by a simplicity of physical structure in that such cells can be constructed without any moving parts.

While a variety of electrochemical reactions are known for the conversion of fuel into electricity with the direct burning of such fuels, one well-known form of cell utilizes the reaction between oxygen and hydrogen, the hydrogen serving as the fuel. One common form of construction for the hydrogen-oxygen cell is the laminated structure wherein the electrodes are spaced apart by a porous layer of material which holds an electrolyte. For example, the electrolyte may be a concentrated phosphoric acid. The hydrogen is guided by passageways behind the active region of the anode and the oxygen is guided by passageways behind the active region of the cathode. At the anode, the hydrogen gas dissociates into hydrogen ions plus electrons in the presence of a catalyst, typically a precious metal such as platinum or platinum with other metals. The hydrogen ions migrate through the electrolyte to the cathode in a process constituting ionic current transport while the electron travels through an external circuit to the cathode. In the presence of a catalyst at the cathode, the hydrogen ions, the electrons, and molecules of oxygen combine to produce water.

In order to provide for the physical placement of the respective reactants at the catalyst layers of the anode and cathode, layers of materials having hydrophilic and hydrophobic properties are disposed in an arrangement contiguous to the catalyst layers. They permit the electrolyte and the oxygen at the cathode and the hydrogen at the anode to contact the catalyst layer. The hydrophobic material is provided with pores of sufficiently large size to permit the gaseous hydrogen and the gaseous oxygen to freely flow through the material so as to come into contact with the catalyst.

Details in the construction of fuel cells, and in the component parts thereof, are disclosed in the U.S. Pat. Nos. 3,453,149 of Adlhart and 4,064,322 of Bushnell. These two patents show structures for guiding the gaseous reactants into the regions of the catalyst. In addition, the Bushnell patent shows space within a cell for the storage of electrolyte so as to compensate for any changes in the quantity of electrolyte available for ion transport. An assembly for combining together a plurality of fuel cells in a single power source is disclosed in U.S. Pat. No. 4,175,165 of Adlhart. This patent also shows a manifold for the simultaneous feeding of the reactant gases to the cathode and anode of the respective cells. The foregoing three patents are incorporated herein in their entirety by reference.

A problem arises during the operation of a fuel cell in that the cell has electrolyte losses. For instance, as a result of electrolyte volume changes, such as those due to temperature and composition changes, electrolyte can be driven out of the matrix and be permanently lost from use within the matrix. A fuel cell has limited capacity for the storage of additional electrolyte therein. Thus, depending on the amount of such storage capacity, there is limitation on the length of time during which the fuel cell can be operated before shutdown for maintenance. Such maintenance includes the replenishment of the amount of electrolyte in the requisite concentration.

A related problem is found in the distribution of electrolyte in the porous layer between the electrodes. The electrolyte is normally distributed fairly uniformly throughout the porous layer at the time of the construction of the cell. However, later, during operation of the cell, the distribution of the electrolyte can become less uniform. For example, there may be greater loss at the edges of the cell than at the central portion. Even though the porous layer has an initial charge of electrolyte, the rate of transport of electrolyte transversely through the layer is so slow as to preclude adequate compensation for the selective diminution of electrolyte at various sites along the electrodes and along the layer. In those areas wherein the electrolyte disappears completely, there results a space through which the oxygen and the hydrogen can mix with consequential damage to the cell.

An attempted solution of the foregoing problem by the use of large or smaller pores in such porous layer is of little help in solving this problem. Enlargement of the pore size reduces the capillary forces and, hence, the effectiveness of the layer as a barrier to the mixing of the gaseous reactants. Reduction of the pore size reduces the liquid transport rate and, hence, diminishes the probability of maintaining uniform distribution of the electrolyte.

Additional problems arise from the complexity of the structure required to lead the electrolyte in from a region of storage to the region of electrochemical activity alongside the layers of the catalyst. Such electrolyte lead-in structures are described in the foregoing Bushnell patent. In particular, it is noted that such structures tend to increase the size of the cell, to increase resistance losses associated with the flow of electric current, and to decrease the surface area available for the electrochemical reactions.

SUMMARY OF THE INVENTION

The foregoing problems are overcome and other advantages are provided by a fuel cell constructed in accordance with the invention, the fuel cell having a laminated structure wherein the electrodes are spaced apart by a layer of varying porosity. In a preferred embodiment of the invention, the porous material is provided as a matrix assembly having a central layer of relatively large pores. The central layer is disposed between two layers of material having relatively small pores and being positioned on opposite sides of the central layer. At least one of the matrix layers must be non-conducting of electrons. Either the large or small pore material may be fabricated of sheets of fibrous carbon as long as the other is non-conducting of electrons. By placing the matrix assembly between the two electrodes, the matrix assembly can serve to apply electrolyte to the space between the anode and the cathode while the fluidic or gaseous reactants are supplied to the exterior sides of the electrodes, hydrogen being provided to the anode and oxygen being provided to the cathode. The emplacement of the electrolyte between the two electrodes provides for an ionically conducting path whereby the hydrogen ions propagate from the anode to the cathode while the electrons travel from the anode to the cathode via an external circuit to which the fuel cell is coupled.

In accordance with a major feature of the invention, the large pores of the central layer of the matrix assembly permit the flow of electrolyte among various locations within the central layer as well as form a reservoir external to the fuel cell. The central portion provides a means for holding and moving electrolyte whereby the electrolyte is drawn for uniform distribution about the central layer. The central layer provides internal storage for electrolyte without added complexity to the cell structure since the fuel cell avoids the use of complex structures for the conducting and storage of electrolyte within the cell. The outer layers of the matrix assembly, having smaller pores, draw and strongly hold the electrolyte which contacts the catalyst layers of the electrodes. Because the electrolyte is tightly held within the small pores of the outer layers of the matrix assembly, the outer layers effectively serve as a barrier to the flow of the fluidic or gaseous reactants.

In accordance with a further feature of the invention, an external reservoir holds electrolyte and is connected via a feed means such as tubing to the central layer for replenishment of electrolyte. The addition of electrolyte from the external reservoir to the matrix assembly in the cell compensates for changes in volume of electrolyte within the cell. The central layer must have good in-plane transport properties to uniformly distribute the electrolyte. The cell can operate at atmospheric pressure so that the electrolyte can freely flow via the feed means in accordance with said volume changes.

BRIEF DESCRIPTION OF THE DRAWINGS

The aforementioned aspects and other features of the invention are explained in the following description taken in connection with the accompanying drawing wherein:

The single FIGURE shows a perspective view of a portion of a stack of fuel cells in an assembly of such fuel cells, the portion comprising one complete fuel cell with a second cell being partially shown in phantom and the fuel cell being sectioned to identify the individual layers thereof.

DETAILED DESCRIPTION OF THE INVENTION

The sole FIGURE shows a fuel cell 10 in perspective view. A part of a second fuel cell 10A, having the same construction as the cell 10, is shown in phantom and is placed contiguous to the cell 10, as would be the case if the cell 10 is understood to be one of many such cells which would ordinarily be placed in a stack (not shown). Connections of the cells 10 and 10A via manifolds for the conveyance of reactants are shown schematically. Two such representative manifolds are shown, namely, a manifold 12 for the conveyance of hydrogen to the anode of respective cells of the stack and a manifold 14 for the conveyance of oxygen to the cathode of respective cells of the stack. Although manifolds 12 and 14 are shown in a representative fashion in the FIGURE, it is understood that a single manifold for each reactant running generally along the sides of the stack can feed reactants to the cells through respective passages 26.

The fuel cell 10 comprises two electrodes, namely, an anode 18 and a cathode 20 which are separated by an electrolyte matrix assembly 22. Each electrode abuts a solid, nonporous, gas distribution plate 24. The top of the cell in the FIGURE, having grooves to bring in and distribute only one reactant since it is at the end of the stack, has a plate 24. The plate 24 on the other side of the cell depicted is part of a bi-polar plate made up of two gas distribution plates 24 in back-to-back position to supply reactants to the cell shown and the adjacent cell (not shown).

Both plates 24 have passages 26 for the entry of the fluidic or gaseous reactants and elimination of any residual gases. Each electrode comprises a hydrophobic substrate layer 28 and a catalyst 30. The plates 24 of the cell 10A provides a series interconnection of the two cells.

The matrix assembly 22 comprises a central permeable layer 32 of fibrous carbon sheet material having relatively large pores, the central layer 32 being positioned between two outside permeable layers 34 with pores which are smaller than the pores of the central layer 34. An electrolyte, typically phosphoric acid, is contained in the central layer 32. The pores of the central layer 32 are sufficiently large to permit the electrolyte to freely migrate through the central layer 32 so as to replenish the electrolyte within the cell 10 as may be required. The central layer 32 need not necessarily be completely filled with the electrolyte, it being necessary only to provide sufficient electrolyte to insure ionic conductivity between the electrodes 18 and 20.

The smaller pores of the outside layers 34 exert a strong capillary force which draws in the electrolyte from the central layer 32 to completely fill the outside layers 34. Layers 34 have fast rate of uptake of electrolyte contained in the large pore layer 32 as needed. By providing adequate electrolyte to layers 34, each outside layer 34 serves as a barrier against the flow of reactant gas into the matrix assembly area. Thus, electrolyte is found in each of the three layers of the matrix assembly 22 to provide ionic conductivity to the matrix assembly 22, the matrix assembly 22 with the electrolyte therein serving as a path by which positive hydrogen ions can migrate via ionic current transport from the anode 18 to the cathode 20.

The outer layers 34 of the matrix assembly 22 have silicon carbide powder bonded with PTFE particles for increased hydrophilic properties to further insure that the layers 34 serve as gas barriers. In contrast, the hydrophobic layers 28 are impregnated with PTFE on the base material of fibrous carbon to produce the hydrophobic characteristics. The porosity of the hydrophobic layer 28 is characterized by large pores through which the gaseous reactants can freely circulate so as to propagate from the passages 26 to the catalyst 30. Thus, the catalyst 30 is surrounded by hydrophobic and hydrophilic layers, the hydrophobic layer facing the gaseous reactants and the hydrophilic layer facing the electrolyte.

The hydrophobic layer 28 in each electrode is impregnated with Teflon to prevent the electrolyte from flooding into the electrode. This is an advantageous feature in the construction of the cell 10 since such flooding, if permitted, would reduce the number of open pores through which the gaseous reactants must pass in the electrodes. A reduced number of available pores would result in a diminution in the capacity of the cell to produce electricity.

The hydrophobic layer 28 brings the gaseous reactant into contact with the catalyst 30 while the hydrophilic layer 34 brings the electrolyte into contact with the catalyst 30. Thereby, respective electrochemical reactions can take place at the catalyst 30 of the anode 18 and at the catalyst 30 of the cathode 20. The catalyst 30 is conveniently formed of a precious metal, such as platinum, with or without other metals, which, for the purposes of bonding and partial wet-proofing, is deposited on the hydrophobic layer 34. The same construction is utilized in each of the electrodes 18 and 20. It is noted that both the hydrophobic layer 28, the plate 24 and the electrodes 18 and 20 are electrically conducting. Thus, in the case of the anode 18, electrons released by the electrochemical reaction can propagate from the catalyst 30 through the fibrous carbon of the hydrophobic layer 28 and into the partitions or ribs 36 of the plate 24 which separate the respective passages 26.

In the series arrangement depicted in the FIGURE, the electrons from the anode of one cell are conducted directly to the cathode of the adjoining cell so as to migrate through the entire stack. An exemplary stack termination contact 38 is shown attached by conventional methods to the plate 24 of the anode 18. The contact 38 is coupled to an external circuit 40 (indicated in block diagrammatic form) while the other terminal of the external circuit 40 is coupled to a similar contact (not shown) at the opposite end of the stack of the fuel cells. The electrons can, thereby, make a complete circuit from the negative terminal of the stack (the last of the anodes) via the external circuit 40 to the positive terminal at the stack (the first of the cathodes). Correspondingly, the hydrogen ions can migrate in each cell through the electrolyte contained in the matrix assembly proceeding from the anode of the cell through the cell to the cathode of the cell.

In operation, hydrogen is admitted through the manifold 12 to the passages 26 in the anodes 18 of each of the cells in the stack. Oxygen is admitted through the manifold 14 into the passages 26 of the cathodes 20 in each of the cells of the stack. By capillary action, the electrolyte is brought into contact with the catalyst 30 in each of the electrodes 18 and 20. The hydrogen propagates from the passages 26 through the pores of the hydrophobic layer 28 to the catalyst 30 in the anode 18. The oxygen propagates from the passages 26 through the hydrophobic layer 28 to the catalyst 30 in the cathode 20. Thereby, the hydrogen and the electrolyte are placed in contact with each other at the interface of the catalyst 30 at the anode 18 and the oxygen and the electrolyte are placed in contact with each other at the interface of the catalyst 20. It is in these locations of the cell that the respective electrochemical reactions to produce electricity occur.

In accordance with a feature of the invention, the matrix assembly 22 continuously distributes electrolyte from sites within the central layer 32 and from a reservoir 50, which contains electrolyte, to insure that the outer hydrophilic layers 34 are always filled with the requisite amount of electrolyte. The reservoir 50 is located outside the cell and is coupled to the central layer 32 by any suitable feed means such as by tube 52 which serves as an electrolyte conducting means. With this arrangement, electrolyte can be fed from reservoir 50 through the tube 52 and to and into cell 10 via central layer 32 without any interference with the conduction of reactant gases in the cell. The feed means can extend into and across the central layer 32. The connection of tube 52 with the central layer 32 can be accomplished with the aid of a gasket (not shown) to prevent spillage of electrolyte.

In an alternative embodiment, the feed means can be made of the same or a similar material as the central layer 32, extending from the reservoir to the central layer 32. In another embodiment, the feed means can be an extension of the central layer 32 itself which passes out of the cell to the reservoir or to a feed means which is connected to the reservoir. The height of the reservoir 50 can be adjusted to provide a hydrostatic pressure on the electrolyte as it flows from the reservoir to the cell. Any suitable means can be used for externally replenishing electrolyte to the cell as needed. For instance, when the central layer 32 extends out of the cell and acts as a feed means, a syringe or other suitable electrolyte handling means can be used to place electrolyte onto the material of layer 32 and into the cell.

Losses of electrolyte in the region between the electrodes may occur during operation of the cell 10 and, if not compensated for, can cause a reduction in the cell's output of electricity or cell burn out. By use of reservoir 50, frequent shutdowns of the cell stack are not required to maintain the proper level of electrolyte in the outer layers 34 of the cells.

The central layer 32 is advantageously fabricated of a filamentary carbon paper manufactured by the Kureha Chemical Industry Company of Tokyo, Japan. The paper is composed of chopped carbon fiber produced from pitch and residual charred carbon of phenolic resin. The fine diameter filaments can average approximately 3 mm. (millimeters) in length and, when bonded together, can form a uniformly thin web. The paper can be approximately 0.003 to 0.020 inches thick, preferably being approximately 0.009 to 0.011 inches thick, and is readily reduced in thickness under compression. The term "large pore" means pores approximately 50–300 microns in size while the term "small pore" means pores approximately 1–10 microns in size. During assembly of the cell 10, the layers thereof are compressed in sandwich-like form under a pressure of approximately 30–50 lbs. per square inch.

The outer layers 34 are Teflon-bonded silicon carbide. The silicon carbide is mixed with a suspension of Teflon (polytetrafluoroethylene) and an inking vehicle such as polyethylene oxide. The mixture is applied to the catalyst side of the electrode and then smoothed such as by a blade. The mixture is dried and sintered. The electrolyte is then added to the layers during assembly of the cell.

The above described process produces a material having a small pore size in the ranges described. Any suitable material can be used for layers 34. For instance, the material can be made from inert, coagulated fluorocarbon polymer in the form of a network structure, and a free concentrated acid electrolyte entrapped in said network, wherein the inorganic particles are a compound which is a member of the group consisting of an oxide, sulfate and phosphate of at least one of the metals zirconium, tantalum, tungsten, chromium, and niobium as described in U.S. Pat. No. 3,453,149. This patent is incorporated herein in its entirety by reference.

Further details on the construction of the respective layers of the cell 10 are well known, and are described, by way of example, in the foregoing U.S. Pat. Nos. 3,453,149; 4,064,322 and 4,175,165. These patents describe the construction of cells utilizing porous material with impregnations of PTFE and coatings of precious metal catalysts. The multiple porosity characteristic of the matrix assembly 22 provides for both the hydrophilic properties of the outer layers 34 while utilizing the larger pores of the central layer 32 for holding and moving the electrolyte and distributing the electrolyte so as to maintain the electrolytic saturation of the outer layers 34 during operation of the cell 10. In addition, the presence of the electrolyte in all three layers of the matrix assembly 22 provides the requisite conduction path for the hydrogen ions. Thus, the matrix assembly 22 of the invention permits the cell 10 to operate normally in conjunction with the external reservoir 50 for maintaining the uniform distribution of electrolyte.

It is to be understood that the above described embodiment of the invention is illustrative only, and that modifications thereof may occur to those skilled in the art. Accordingly, this invention is not to be regarded as limited to the embodiment as disclosed herein, but is to be limited only as defined by the appended claims.

What is claimed is:

1. In a fuel cell system including a fuel cell having electrodes wherein electrochemical reactions take place between fluidic reactants and an electrolyte, an electrolyte distribution system comprising:
    first and second porous layers arranged in a laminated format within said fuel cell, one of said layers being electrically insulating but permitting the flow of ionic current when filled with electrolyte;
    said first layer having relatively large pores for holding electrolyte in an ionic conduction path between said electrodes and for in-plane transporting of electrolyte;
    said second layer having relatively small pores for drawing electrolyte from said first layer, said second layer being positioned contiguous to an interaction surface of one of said electrodes for supplying electrolyte to the electrochemical reaction at said one electrode;
    a reservoir supporting electrolyte outside said fuel cell; and
    means for conducting said electrolyte between said first layer and said reservoir, said means communicating directly between said first layer and said reservoir.

2. A system according to claim 1 further comprising a third porous layer arranged in a laminated format with said first and said second layers, said third layer having relatively small pores as compared to the pores of said first layer for drawing electrolyte from said first layer, said third layer being positioned contiguous to an interaction surface of a second of said electrodes for supplying electrolyte to an electrochemical reaction at said second electrode.

3. A system according to claim 2 wherein said insulating layer is formed of silicon carbide particles bonded with polytetrafluoroethylene.

4. A system according to claim 3 wherein the electrolyte in said cell and in said reservoir are at the same pressure.

5. A system according to claim 4 wherein each of said electrodes comprises a hydrophobic layer with pores sufficiently large for the migration of said fluidic reactants, said second and said third layers being hydrophilic, said cell further comprising a catalyst disposed along a surface at each of said electrodes between one of said hydrophilic layers and one of said hydrophobic layers to aid an electrochemical reaction between one of said fluidic reactants and said electrolyte, and wherein said electrolyte conducting means comprises tubing.

* * * * *